United States Patent [19]

Humphreys

[11] Patent Number: 5,395,634

[45] Date of Patent: Mar. 7, 1995

[54] METHOD FOR COOKING A LIPID-CONTAINING FOOD PRODUCT BY USING AN ANTIOXIDANT AND A NON-OXIDIZING GAS ATMOSPHERE

[76] Inventor: Benjamin R. Humphreys, Rte. 2, Box 5130, White Stone, Va. 22578

[21] Appl. No.: 718,751

[22] Filed: Jun. 21, 1991

[51] Int. Cl.⁶ ............................................. A23B 9/20
[52] U.S. Cl. .................................. 426/312; 426/412; 426/442; 426/523; 426/542; 426/654
[58] Field of Search ................ 426/523, 312, 408, 442, 426/412, 407, 418, 541, 474, 523, 438, 542, 316, 320, 654

[56] References Cited

U.S. PATENT DOCUMENTS

| | | |
|---|---|---|
| 2,739,522 | 3/1956 | Graham, Jr. |
| 3,024,114 | 3/1962 | McConville |
| 3,714,887 | 2/1973 | Johnson |
| 3,773,527 | 11/1973 | Ruggerone |
| 4,115,597 | 9/1978 | Pellar ............................ 426/541 |
| 4,187,325 | 2/1980 | Tyree ............................ 426/523 |
| 4,244,979 | 1/1981 | Roderick |
| 4,366,177 | 12/1982 | Wells et al. |
| 4,504,499 | 3/1985 | Finnan .......................... 426/438 |
| 4,551,338 | 11/1985 | Wallace ........................ 426/523 |
| 4,734,291 | 3/1988 | Raffensperger ............ 426/412 |
| 4,885,897 | 12/1989 | Gryouda ..................... 426/418 |
| 4,913,922 | 4/1990 | Hawkes ....................... 426/438 |
| 5,011,699 | 4/1991 | Mitsuda ....................... 426/312 |
| 5,055,313 | 10/1991 | Warren ....................... 426/541 |
| 5,068,115 | 11/1991 | Liebermann ................ 426/438 |
| 5,077,065 | 12/1991 | Ash ............................. 426/418 |
| 5,077,069 | 12/1991 | Chang ......................... 426/541 |
| 5,108,656 | 4/1992 | Schvester ................... 426/418 |
| 5,158,795 | 10/1992 | Chen ........................... 426/312 |

OTHER PUBLICATIONS

"Food–Grade Antioxidants", Kodak, Publication No. ZG-109J, Apr. 1990.
"Antioxidant application", Daniel F. Buck, Kodak Publication No. ZG-254A, Sep. 1989.
"Natural Tocopherols", Eastman Chemical Co., Pub. No. ZG-263, Nov. 1990.

Primary Examiner—Carolyn Paden
Attorney, Agent, or Firm—Antonelli, Terry, Stout & Kraus

[57] ABSTRACT

A food-grade antioxidant and a non-oxidizing gas atmosphere environment are provided in combination in a cooking container and a food is cooked in the presence of the antioxidant and the non-oxidizing gas atmosphere for preventing or reducing oxidation of lipids and vitamins in the food. As a result, rancidity from cooking lipid-containing food, and the resultant off-odors and flavors associated therewith, as well as color changes and loss of nutritional quality of the food, can be reduced or avoided.

20 Claims, 1 Drawing Sheet

METHOD FOR COOKING A LIPID-CONTAINING FOOD PRODUCT BY USING AN ANTIOXIDANT AND A NON-OXIDIZING GAS ATMOSPHERE

TECHNICAL FIELD

The present invention relates to an improved method of cooking food and an apparatus for cooking food, especially lipid-containing foods, which reduce or prevent oxidation of lipids while cooking, thereby avoiding or reducing rancidity from cooking.

BACKGROUND ART

It is known that oxidation causes a deterioration of the flavor and odor of edible fats and oils, resulting in foods with unpleasant tastes and unappetizing odors. Many attempts have been made to combat this deterioration. Improvement in food preparation, refrigeration and packaging materials all help to retard oxidation but are not completely satisfactory or economically feasible in many instances. One solution to this problem is the use of food grade antioxidants such as butylated hydroxyanisole (BHA) and tocopherols which are introduced directly into the food products to inhibit the destructive processes which result in rancidity.

One measurement of performance of an antioxidant is the AOM Stability Test. Results of these tests show that the use of antioxidants can improve the oxidative stability of many foods, including animal fats and butters, coconut and palm kernel oils, essential oils and flavorings of important confectionery ingredients, cereals and nut products, for example. However, the improvement attained with the use of antioxidants is limited, particularly when the antioxidants are used at levels in conformance with existing food additive regulations published by the Food and Drug Administration.

In the June 1985 article from *The Manufacturing Confectioner* titled "Antioxidant applications" by Daniel F. Buck, it is noted that in addition to the off-odors and flavors associated with rancidity from oxidation of fats and oils, oxidation can result in color changes, loss of flavor and odor as well as changes in the nutritional quality of food products. For example, when oxidation occurs, fat soluble vitamins such as A, D, and E are destroyed. The caloric content of foods can also decrease and essential fatty acids such as linoleic acid are lost. The article states that oxidation probably affects fats and oils more severely than any other food component or product. The problem is widespread in that, illustratively, many components of confectionery products are high in lipid content and prone to oxidation. Dairy products, fats and oils, nuts, fruits, cereals and essential oils all tend to undergo oxidative deterioration that results in loss of fresh aroma and flavor.

Fish oils are a source of omega 3 long chain fatty acids. Recent research with animals and humans suggests that the omega 3 fatty acids may protect against certain vascular diseases. Experiments on ingestion of omega 3 fatty acids have not been in agreement in this regard. One possible explanation is that in some cases cooking of the fish oil has oxidized the omega 3 fatty acids and reduced or eliminated their alleged protective characteristics.

Heat associated with cooking can promote or catalyze oxidation. Oxidation is typical of most chemical reactions. A 10° C. increase in temperature essentially doubles the reaction rate.

There have been attempts to overcome this problem. For example, in U.S. Pat. No. 3,024,114 a process of preparing fish for canning is disclosed wherein the fish are wrapped in a semi-permeable film prior to a precooking operation with such film restricting evaporation of the natural fish juices during the precooking operation, while restraining direct contact of oxygen or steam with the fish meat. The disclosed process appreciably increases the yield of light-colored meat as compared to existing processes. This process is disadvantageous in that it requires the use of a semi-permeable film and the extra step of wrapping the fish in the film prior to the precooking operation.

U.S. Pat. No. 4,244,979 relates to an oven-type apparatus and method for holding and cooking food. The food is located in inner means with restrictive louvered slots constructed and arranged to provide for additional moisture exchange and/or additional heat exchange between an outer stream of circulating air and the inner core of stable air surrounding the food within the inner means, but without any significant amount of air flow in direct contact with the food for obtaining a fresh-cooked taste, fragrance and appealing appearance of the food. The patentee is not concerned with lipid deterioration, but rather with closely controlling the cooking through the use of uniform temperatures and control of the moisture.

A method of flameless broiling or baking greasy meat products is disclosed in U.S. Pat. No. 4,366,177. In order to avoid flaming or flaring of grease or grease vapors during broiling, the meat products are broiled in a tunnel oven. The vapors produced during cooking including steam, grease vapor and other vaporized volatile constituents produced within the tunnel are selectively vented to remove only an excess of these products of heating. A very slight overpressure of these vapors then exists in the tunnel as an oxygen-starving atmosphere which inhibits burning or flaring up of the grease or grease vapors during broiling. The patentees do not address the problem of preventing lipid degradation or change through exposure to oxygen.

It is known to package food in a vacuum or protective gas to inhibit botulism. For example, U.S. Pat. No. 3,773,527 discloses a method of preserving cooked potatoes wherein peeled, cooked and cut fresh potatoes are preserved in a sealed refrigerated container filled with a mixture of carbon dioxide and nitrogen. U.S. Pat. No. 3,714,887 is for an apparatus for crushing fruit in an inert gas, for example, carbon dioxide or nitrogen, for maintaining the fruit out of contact with oxidizing air. U.S. Pat. No. 2,739,522 is for an apparatus for deaerating and storing oxidizable material. Storage tanks filled with non-oxidizing gas are employed. These patents do not relate to cooking and, in particular, are not concerned with degradation or change of lipids in food during cooking.

DISCLOSURE OF INVENTION

An object of the present invention is to provide an improved method of cooking food and an apparatus for cooking food, particularly lipid-containing food, which prevent or substantially reduce oxidation of lipids and vitamins in the food so that the odor, flavor and nutrition of the food are retained to a high degree during the cooking.

These and other objects are attained by the method of cooking food of the invention which comprises introducing a non-oxidizing gas into a cooking container to provide a non-oxidizing gas atmosphere for cooking food in the container, and cooking food in the container in the non-oxidizing gas atmosphere. According to a preferred embodiment of the invention, the method further comprises providing an antioxidant with the food in the container in which the food is to be cooked in the non-oxidizing gas atmosphere. With the combination of an antioxidant and a non-oxidizing gas atmosphere in the container during cooking, the flavor, odor, color and nutritional value of the food are retained to a high degree through the cooking process.

As further features of the method of the invention, the providing of an antioxidant can include basting an antioxidant on the food to be cooked. Alternately, or in addition to basting, the antioxidant can be provided by adding an antioxidant to a liquid with which the food is to be cooked in the cooking container.

The non-oxidizing gas introduced into the container is preferably carbon dioxide, nitrogen or a mixture of carbon dioxide and nitrogen. The gas is flowed into the cooking container from a pressurized supply of the gas which is located outside of the cooking container. The method is applicable for cooking all types of foods of vegetable and animal origin, including lipid containing food such as fish, meat and food for making confectionery. The resulting food can be for human consumption or animal feed. The term "food" as used herein is intended to encompass not only materials used in the body of an organism to sustain growth, repair and vital processes and to furnish energy, but also materials for processing or preparing such consumables, including vegetable oils and animal fats.

The food in the non-oxidizing gas atmosphere in the cooking container can be cooked by any of the known types of cooking processes including frying, baking, microwaving, at either atmospheric pressure or less than atmospheric pressure, or under pressure as in a pressure cooker. The process can be either discrete or continuous, depending on the construction of the cooking container.

An apparatus for cooking food according to the invention comprises, in combination, a supply of a non-oxidizing gas, means for introducing non-oxidizing gas from the supply to a cooking container and a cooking container for cooking food placed in the container in an atmosphere of the non-oxidizing gas supplied to the container from the supply. In one form of the invention the cooking container is open at its top and the non-oxidizing gas is heavier than air to shield the food from oxygen in the air during cooking. The cooking container also preferably includes means for closing the cooking container at least during cooking. In the illustrated embodiment, the means for closing the cooking container is in the form of a lid which can be removably positioned on a pan of the cooking container. Vent means are provided in the lid for venting the closed cooking container during cooking to avoid buildup of pressure in the closed cooking container. Alternatively, the vent means include valve means constructed to vent the inside of the container only above a predetermined, elevated pressure for pressure cooking.

The cooking container in the disclosed embodiment further includes an inlet fitting for introducing the non-oxidizing gas from a pressurized supply of the gas. The apparatus of the invention further includes, in combination, heating means for cooking the food in the container. The heating means can be formed separately from the cooking container or integrated, at least in part, with the cooking container.

These and other objects, features and advantages of the present invention will become more apparent from the following description when taken in connection with the accompanying drawing, which shows, for purposes of illustration only, one preferred embodiment in accordance with the present invention.

BRIEF DESCRIPTION OF THE DRAWING

The single drawing figure.

BEST MODE FOR CARRYING OUT THE INVENTION

Figure 1:
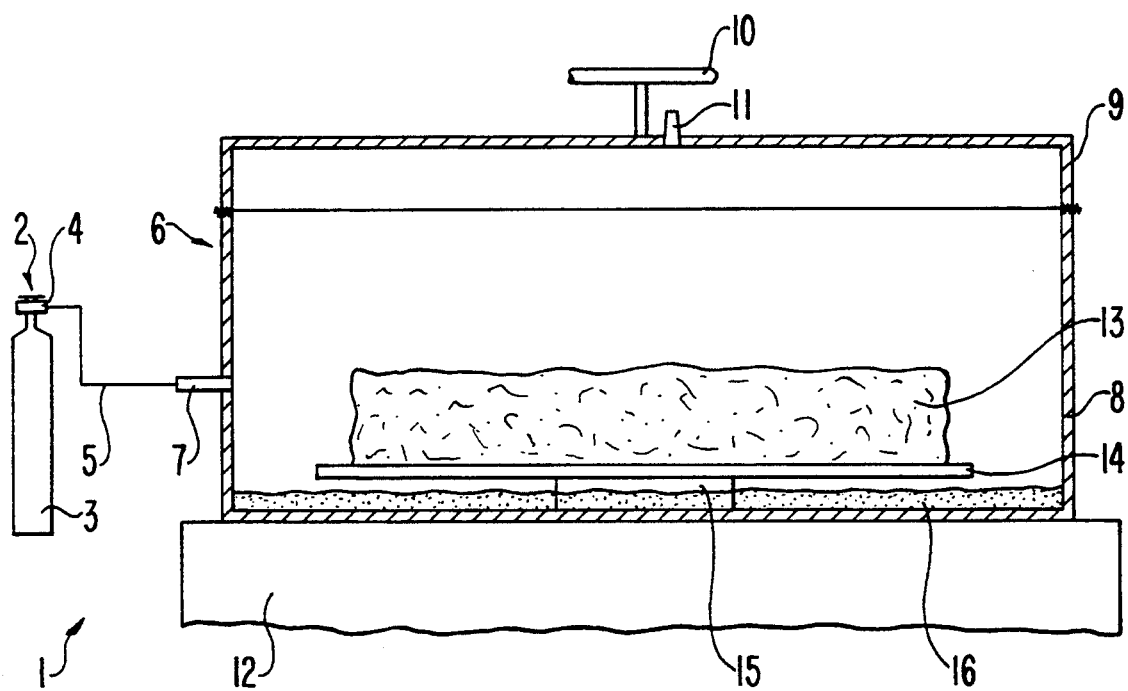
FIG. 1, is a schematic illustration, partially in cross section, of a preferred embodiment of an apparatus for cooking food of the invention which is useful in practicing the method of cooking food of the invention.

The apparatus 1 for cooking food illustrated in FIG. 1 comprises, in combination, a pressurized supply 2 of a non-oxidizing gas, preferably carbon dioxide, nitrogen or a mixture of the two. The pressurized supply 2 of non-oxidizing gas is in the form of a conventional gas cylinder with regulator-valve 4 thereon. Gas is dispensed from the cylinder and valve by way of gas line 5. That is, the gas line 5, shown schematically in FIG. 1, is coupled to a gas inlet fitting 7 in the side wall of the cylindrical container 6 for ingress of the non-oxidizing gas.

The cooking container 6 in the illustrated embodiment is formed of metal, preferably a stainless steel. The container 6 includes a lower portion or pan 8 and a removable cover or lid 9 which can be placed on the pan using a handle 10 on the lid for closing the container. One of the cooperating edges of the pan and lid is preferably formed with a ledge and flange, not shown, for receiving and cooperating with the other edge to form an effective seal therewith in a known fashion. Where the cooking container is used as a pressure cooker, suitable fasteners, not shown, are provided about the circumference of the pan and lid at the juncture thereof for retaining the two in a sealing position against elevated internal pressure in the container during cooking.

The lid 9 further comprises a vent 11 for venting the container to atmosphere during cooking to avoid buildup of pressure in the closed cooking container. Alternatively, the vent 11 can include a valve which is yieldably biased in a closed position so that it is opened to vent the container only above a predetermined, elevated pressure within the cooking container. This causes the cooking container to function as a pressure cooker. The pan 8 can also be formed with one or more handles, not shown.

The apparatus 1 of the invention further comprises means for cooking the food contained in the cooking container 6. In the illustrated embodiment the container 6 is shown resting on the top of a burner 12 of a stove, such as a gas or electric stove, for heating the cooking container and the food therein for cooking the food. A quantity of lipid-containing food 13 to be cooked is located in the container 6 on a grate 14 supported on the floor of the pan 8 by way of a center pedestal 15 of the grate. In one form of the invention, this center pedestal 15 includes a mechanism for rotating the grate 14 and the food 13 thereon during cooking. This would be especially desirable where cooking is to be performed by microwaving. The container 6 and grate 14 are formed of a material such as plastic which is microwaveable, rather than metal, in this instance. The cooking container would be placed in a microwave oven for cooking the food.

According to the method of cooking food of the invention, a non-oxidizing gas from supply 2 is introduced into the cooking container 6 by way of regulator-valve 4, gas line 5 and gas inlet fitting 7. This can be accomplished before, during or after placing food in the container to be cooked. The food is then cooked in the container in the non-oxidizing gas atmosphere through heating the container and the food therein by means of burner 12. Alternatively, the cooking container 6 Could be located in a conventional oven, or where constructed of appropriate materials, placed in a microwave oven for cooking. If necessary, gas can be continuously or intermittently added during cooking to maintain the protective non-oxidizing gas for the food being cooked. In another form of the invention, the heating means for cooking could be incorporated into the cooking container itself as in an electric fry pan construction, for example.

A further step of the preferred embodiment of the method of the invention comprises providing an antioxidant with the food in the container so that the food is cooked in the presence of both the non-oxidizing gas atmosphere and the antioxidant. The antioxidant can be provided by basting an antioxidant on the quantity of food 13 to be cooked either prior to or after the food is placed in the pan 8 of the container. In addition, or instead of basting, an antioxidant can be provided by adding an antioxidant to a liquid with which the food is to be cooked in the cooking container.

The antioxidant can be a conventional antioxidant which will not be steam distilled during cooking. Illustratively, butylated hydroxyanisole (BHA) or a tocopherol could be used. The antioxidant is used in a quantity which does not exceed the permissible level according to the Food and Drug Administration regulations. For example, BHA can be employed at a level not to exceed 0.02% based on the weight of fat or oil, including essential oil, content of the food. The antioxidant can be basted on the food 13 to be cooked by spraying the antioxidant in a food-grade solvent such as propylene glycol, ethanol or vegetable oils, and/or added to a liquid 16 in which the food is to be cooled. Citric acid can also be provided in the container 6 in combination with the antioxidant, as an effective metal chelating agent and synergist.

When the food to be cooked is a lipid-containing food, the non-oxidizing gas atmosphere together with the antioxidant in the cooking container markedly limit the oxidation of the food during cooking thereby avoiding rancidity and the attendant off-odor and flavor associated with it. Nutritionally, vitamins in the food, such as vitamins A, D and E are protected from oxidation and destruction. As a result, the food cooked will not only have enhanced flavor, but will also be more nutritious as compared with conventionally cooked food thereby making it more desirable for consumption in restaurants and homes. Animal feeds are also effectively processed with the method and apparatus of the invention. Illustratively, Menhaden fish cooked in the apparatus of the invention and according to the method of the invention in a non-oxidizing gas atmosphere of nitrogen with an antioxidant of Tenox 22 in a concentration of 0.05% based on the weight of the oil content of the whole fish produces a fish meal noticeably lighter in color and having a fresher smell, to be used in pet foods. Poultry by-products can be processed in a like manner for making pet foods. The method and apparatus is also particularly useful in processing of fat-containing foods for making candy and other confectionery.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A method of cooking an uncooked lipid-containing food comprising providing both an antioxidant and a non-oxidizing gas atmosphere in a cooking container for cooking an uncooked lipid-containing food, and cooking the uncooked lipid-containing food in the container in the presence of the antioxidant and the non-oxidizing gas atmosphere wherein the oxidation of the food during cooking is markedly limited.

2. The method according to claim 1, of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein said antioxidant includes a tocopherol.

3. The mehtod according to claim 1, of cooking a lipid-containing food comprising providing both an antioxidant and a non-oxidizing gas atmosphere in a cooking container for cooking a lipid-containing food, and cooking the lipid-containing food in the presence of the antioxidant and the non-oxidizing gas atmosphere, wherein the oxidation of the food during cooking is markedly limited, and wherein said antioxidant includes butylated hydroxyanisole.

4. The method according to claim 1, wherein the uncooked food which is cooked is for human consumption after cooking.

5. The method according to claim 1, wherein the non-oxidizing gas atmosphere provided in the container is carbon dioxide, nitrogen or a mixture of carbon dioxide and nitrogen.

6. The method according to claim 1, wherein a non-oxidizing gas is introduced into said container by flowing said non-oxidizing gas into said cooking container from a pressurized supply of said gas which is located outside of said cooking container to provide said non-oxidizing gas atmosphere.

7. A method of cooking a an uncooked lipid-containing food comprising providing both an antioxidant and a non-oxidizing gas atmosphere in a cooking container for cooking an uncooked lipid-containing food, and cooking uncooked lipid-containing food in the container in the presence of the antioxidant and the non-oxidizing gas atmosphere wherein the oxidation of the food during cook is markedly limited, and wherein said providing an antioxidant includes basting an antioxidant on the food to be cooked.

8. The method according to claim 2, wherein said providing an antioxidant includes adding an antioxidant to a liquid with which the food is to be cooked in the cooking container.

9. A method of cooking an uncooked lipid-containing food comprising providing both an antioxidant and a non-oxidizing gas atmosphere in a cooking container for cooking an uncooked lipid-containing food, and cooking uncooked lipid-containing food in the container in the presence of the antioxidant and the non-oxidizing gas atmosphere wherein the oxidation of the food during cook is markedly limited, and wherein citric acid is also provided in the container in which the food is to be cooked in the non-oxidizing gas atmosphere.

10. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein the food is fish.

11. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein the food is meat.

12. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein the food is for making a confectionery.

13. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein the food is an animal feed.

14. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein said cooking container is open at its top and wherein said non-oxidizing gas is heavier than air to shield the food in the container from oxygen in the air during cooking.

15. The method according to claim 1, including closing the cooking container at least during said cooking.

16. The method according to claim 15, including venting the closed cooking container during cooking to avoid buildup of pressure in said closed cooking container.

17. The method according to claim 15, wherein the closed cooking container is a pressure cooker, said food being cooked under pressure in said non-oxidizing gas atmosphere during said cooking.

18. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein said cooking container is a frying pan and said cooking includes frying the food in the non-oxidizing gas atmosphere in the frying pan.

19. A method of cooking a lipid-containing food comprising providing both an antioxidant and a non-oxidizing gas atmosphere in a cooking container for cooking a lipid-containing food, and cooking the lipid-containing food in the container in the presence of the antioxidant and the non-oxidizing gas atmosphere, wherein the oxidation of the food during cooking is markedly limited, and wherein said cooking includes baking the food in the non-oxidizing gas atmosphere in the cooking container.

20. A method of cooking an uncooked lipid-containing food comprising providing both an antioxidant and a non-oxidizing gas atmosphere in a cooking container for cooking an uncooked lipid-containing food, and cooking the uncooked lipid-containing food in the container in the presence of the antioxidant and the non-oxidizing gas atmosphere wherein the oxidation of the food during cook is markedly limited, and wherein said cooking includes microwaving the food in the non-oxidizing gas atmosphere in said cooking container.

* * * * *